United States Patent [19]

Woo et al.

[11] Patent Number: 4,879,344

[45] Date of Patent: Nov. 7, 1989

[54] ACRYLIC/SILICONE RESINS FOR POWDER COATINGS

[75] Inventors: James T. K. Woo, Medina; John C. Reising, Avon; Richard M. Marcinko, North Royalton, all of Ohio; David E. Miles, Port Huron, Mich.

[73] Assignee: The Glidden Company, Cleveland, Ohio

[21] Appl. No.: 229,269

[22] Filed: Aug. 8, 1988

[51] Int. Cl.[4] ............................................. C08F 8/00
[52] U.S. Cl. ............................... 525/100; 264/331.18; 524/431; 524/432; 524/440; 524/445; 524/449; 524/451

[58] Field of Search ................... 525/100; 264/331.18; 524/431, 432, 440, 445, 449, 451

[56] References Cited

U.S. PATENT DOCUMENTS

| 4,446,259 | 5/1984 | Vasta | 524/506 |
| 4,472,484 | 9/1984 | Vasta | 428/463 |
| 4,684,697 | 8/1987 | Chang et al. | 525/104 |
| 4,795,783 | 1/1989 | Hunt | 525/100 |

Primary Examiner—Melvyn I. Marquis
Attorney, Agent, or Firm—Thomas M. Schmitz

[57] ABSTRACT

A powder paint coating is based upon a thermosetting polymeric binder comprising a hydroxyl functional arcylic copolymer adapted to coreact upon heating with solid cyclic silicone resin.

6 Claims, No Drawings

ACRYLIC/SILICONE RESINS FOR POWDER COATINGS

This invention pertains to blends of a hydroxyl functional acrylic polymer and solid cyclic silicone resin to provide a binder for powder paint coatings.

Acrylic resins useful in powder coatings are known to exhibit good weathering properties if the acrylic copolymer does not contain major amounts of copolymerized styrene. U.S. Pat. No. 4,446,259 and U.S. Pat. No. 4,472,484 disclose blends of acrylic binder and silicone resin. Acrylic copolymers of silicone resin should provide considerably improved weathering properties and should offset other film property deficiencies of silicone resins. However, attempting to co-react acrylic copolymer with silicone resins is difficult to achieve in practice since the reaction is difficult to control and often results in useless crosslinked polymers known as gels. The reaction is difficult to control due to hydroxyl groups on the acrylic polymer as well as the hydroxyl groups on the silicone polymer. For instance, a hydroxylated acrylic copolymer prepared in solvent and subsequently reacted with hydroxyl or alkyl ether groups in silicone resin either gelled upon coreaction or gelled during the process of stripping solvent off the resulting product.

It now has been found that a hydroxyl functional acrylic polymer blended with solid cyclic silicone resin provides an excellent polymeric binder combination useful in powder paint coatings to provide paint films which exhibit superior exterior weathering properties. The polymeric blends of this invention advantageously can be formulated into powder paints to provide a low gloss or variable gloss appearance to durable exterior powder coatings. Substantially improved chalk resistance and unexpectedly good exterior weathering are obtained from the blended polymers. The polymeric blend can be combined with other additives to produce clear or pigmented powder coatings. These and other advantages of this invention will become more apparent by referring to the detailed description of the invention and the illustrative examples.

SUMMARY OF THE INVENTION

Briefly, the invention pertains to powder coatings containing a polymeric binder combination of a hydroxyl functional acrylic polymer and a solid cyclic silicone resin. Dry powders of both the acrylic polymer and the silicone resin are blended uniformly together with other powder paint additives, including filler and colorant pigments if desired, and preferably simultaneously extruded under heat and pressure to form powder paint particles useful as a powder paint coating on exterior substrates.

DETAILED DESCRIPTION OF THE INVENTION

The invention pertains to a polymeric binder for powder paint coatings where the binder comprises a dry blend of hydroxyl functional acrylic polymer and solid cyclic silicone resin.

Referring first to the hydroxyl functional acrylic polymer, the acrylic polymer is produced by copolymerization of ethylenically unsaturated monomers including acrylic and hydroxyl functional monomers. Ethylenic monomers contain carbon-to-carbon unsaturation and include vinyl monomers, acrylic monomers, allylic monomers, acrylamide monomers, and mono- and dicarboxylic unsaturated acids. Vinyl monomers include vinyl esters, vinyl acetate, vinyl propionate, vinyl butyrates, vinyl benzoates, vinyl isopropyl acetates and similar vinyl esters; vinyl halides such as vinyl chloride, vinyl fluoride, and vinylidene chloride; vinyl aromatic hydrocarbons such as styrene, methyl styrenes and similar lower alkyl styrenes, chlorostyrene, vinyl toluene, vinyl naphthalenes, divinyl benzoate, and cyclohexene; vinyl aliphatic hydrocarbon monomers such as alpha olefins such as ethylene, propylene, isobutylene, and cyclohexene as well as conjugated dienes such as 1,3 butadiene, methyl-2-butadiene, 1,3-piperylene, 2,3 dimethyl butadiene, isoprene, cyclopentadiene, and dicyclopentadiene; and vinyl alkyl ethers such as methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, as well as amino acrylates and methacrylates. Acrylic acids include acrylic and methacrylic acid, ethacrylic acid, alpha-chloroacrylic acid, alpha-cycanoacrylic acid, crotonic acid, and beta-acryloxy propionic acid. Other useful ethylenic monomers can include N-alkylol amides such as acrylamides or methacrylamides including N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or iso-butyl alkyl groups. Hydroxyl functional monomers include hydroxy alkyl acrylates such as 2-hydroxy ethyl acrylate and methacrylate, 2-hydroxy propyl acrylate and methacrylate, and similar lower alkyl 2-hydroxy acrylates.

In accordance with this invention, the hydroxyl functional acrylic polymers comprise copolymerized monomers on a weight basis between 50% and 73% acrylic monomer, between 7% and 30% hydroxyl functional monomer, with the balance being other ethylenically unsaturated monomer. The hydroxy acrylic polymers are solid resins at ambient temperature with a Tg above about 40° C., typically about 55° C., and tack temperature above about 80° C. and typically about 90° C. The number average molecular weight as measured by GPC is between 3,000 and 10,000 and preferably between 4,000 and 5,000.

The hydroxyl functional acrylic polymers can be produced in a fusion or solvent polymerization process of the ethylenic monomers where the solvent if any is subsequently stripped from the finished polymer. Generally, the polymerization is conducted at a temperature of about 20°-150° C. in the presence of a free radical generating catalyst. Commonly used free radical initiators include various peroxygen compounds such as the persulfates, benzoyl peroxide, t-butyl hydroperoxide, cumene hydroperoxide, t-butyl diperphthalate, pelargonyl peroxide and 1-hydroxycyclohexyl hydroperoxide, azo compounds such as azodiisobutyronitrile and dimethylazodiisobutyrate; and the like. The amount of initiator typically is between about 0.1 and 3% based on the weight of the copolymerized monomer.

Referring now to the silicone resins useful in this invention, the silicone resins are solid, non-liquid silicone resins at ambient temperature and are primarily based on cyclic silane molecules. Silicone resins are based on a chemical backbone structure comprising alternative silicon and oxygen atoms, where methyl groups primarily or other lower alkyl groups or phenyl groups are attached to the silicon atoms, provided that hydroxyl groups or lower alkyl ether (methoxy or alkoxy groups) are available and attached to silicon atoms for curing purposes. Silicone resins are prepared from organochlorosilanes such as methyltrichlorosilane, phenyltrichlorosilane, and dimethyldichlorosilane, which can be coreacted with an organic halide such as methyl chloride or chlorobenzene in the presence of silicon and copper catalyst to produce chlorosilanes which can be further reacted with water to form hydroxysilanes and dehydrolysis to eventually organopolysiloxanes (silicones). In accordance with this invention, useful silicones comprise cyclic organopolysiloxanes being solids resin at ambient temperatures and having a Tg above about 40° C. and a tack temperature above about 80° C.

Useful cyclic silicones are hydroxy functional cyclic silicones with two or more hydroxyl groups per cyclic silicone molecular unit where the molecular unit has a number average molecular weight between 400 and 800. Molecular weights can be determined by gel permeation chromatography (GPC) in accordance with ASTM D3016-78, or ASTM D3536-76, ASTM D3593-80. Preferred cyclic siloxane is a cyclic silanol having at least two SiOH groups per molecule and where some of the non-hydroxy valence bonds of the silanol contribute to the cyclic structure. Preferred cyclic silicone resins include those disclosed in U.S. Pat. No. 3,912,670 and U.S. Pat. No. 4,107,148, and both said patents are incorporated herein by reference. The most preferred hydroxy functional silicone resin comprises a hydroxy functional low molecular weight cyclic silicone intermediate (Z-6018, Dow Corning) having a number average molecular weight of about 600 and the theoretical formula:

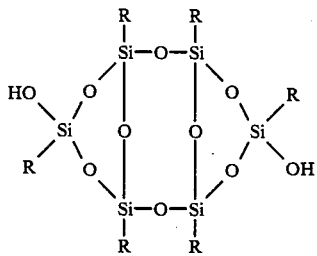

where R is independently a lower alkyl or phenyl group and particularly methyl, ethyl, or phenyl groups. Physical properties of Z-6018 are as follows:

| Appearance | Flaked solid |
| --- | --- |
| Theoretical Silicone Content, wt. percent | 96.6 |
| Nonvolatile Content, percent | 98.0 |
| Volatility, 1.5 gms for 3 hrs. at | |
| 482 F (250° C.), percent | 4.5 |

| Appearance | Flaked solid |
| --- | --- |
| Hydroxyl Content | |
| weight percent | 6.4 |
| hydroxy no. | 211 |
| weight percent free | 0.5 |
| Specific Gravity at 77° F. (25° C.) | 1.23 |
| Durran Melting Point, degrees | 185 F (85° C.) |

The preferred siloxane is Z-6018 and self-condensation products thereof. Such condensation products may contain up to twelve units of the above-identified siloxane and have molecular weights of from about 600 to about 8000 and have the following oligomeric structures of repeating units of cyclic siloxane:

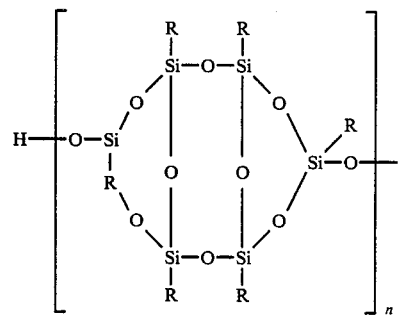

where n is between 1 and 12 and the oligomer can have a number average weight between 600 and 8000 provided the resulting silicone resin has a Tg or softening point above 40° C. and a tack temperature above 70° C.

Solid particles of hydroxyl functional acrylic polymer and the cyclic silicone resin can be dry blended together on a weight basis comprising between 50% and 75% hydroxyl acrylic resin and between 25% and 50% cyclic silicone resin to provide the organic polymeric binder component of the powder paint of this invention. The binder blend or individual dry components thereof can be thoroughly and uniformly mixed with raw batch ingredients by homogenizing the binder, pigmentary solids, plasticizers and other components to uniformly blend the resinous binder with the pigmentary solids. Pigments can ordinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber, chromium oxide green, phthalocyanine green, phthalonitrile blue, ultramarine blue, cadmium pigments, chromium pigments, and the like. Filler pigments such as clay, silica, talc, mica, woolastonite, wood flower and the like can be added. The raw batch ingredients can be thoroughly mixed in a high intensity mixer such as a frustroconical agitator whereby the materials are discharged in a uniform mixture. The high intensity mixer discharges the batch components to a heated screw extruder. The extrudate emerges from the extruder as a ribbon of less than about 1/16 inch thickness which passes onto a water cooled stainless steel conveyor belt whereby the plastic ribbon extrudate fully hardens. The cooled extrudate then passes through a mechanical commuter discharged at the end of the cooled stainless steel belt to efficiently break the fragile brittle ribbon into very small flakes. The small flakes are then discharged onto a cooled mill, such as a hammer mill, to grind the small particles onto powder paint of less than 325 mesh and preferably passing a 200 mesh U.S. Standard sieve screen whereupon the powder can be further classified into particle size if desired.

The powder paints in accordance with this invention can be applied to a steel panel substrte and moderately heated between temperatures of about 180° C. and 200° C. to obtain desirable flow out.

The merits of this invention are further illustrated by the following illustrative examples where pecentages are weight percent and temperatures are ° C., unless otherwise indicated.

EXAMPLE 1

Hydroxyl Functional Acrylic Base Resin

Description: Johnson Wax SCX800B

| Composition | Wt. % | Constants | |
|---|---|---|---|
| Methyl Methacrylate | 35–45 | Non-Volatile Content | >97.0% |
| Butyl Acrylate | 10–30 | Acid Value | 15 |
| Styrene | 10–30 | Softening Pt. | 100° C. |
| 2 Hydroxyethyl Methacrylate | 5–15 | Hydroxyl Value | 43 |
| Methyl Acrylate | 4–8 | ICI Viscosity @ 200° C. | 50p |
| Methacrylic Acid | 1–3 | Glass Transition (Tg) | 43° C. |

EXAMPLE 2A

Acrylic Polymer with OH#=86.3

Into a 5 liter 4 necked round bottom flask was charged 750 g of toluene and the solvent was heated to 108° C. with nitrogen blanket and agitation. The cooling was supplied by a water-cooled condenser. A monomer mixture of the following was prepared:

| | Grams |
|---|---|
| 2-hydroxyethyl methacrylate | 450 |
| Methyl methacrylate | 1058 |
| Styrene | 202.5 |
| Ethyl acrylate | 517.5 |
| Methacrylic acid | 22.5 |
| VAZO 64 | 45 |
| Di-tert. butyl peroxide | 11.25 |
| Mercapto ethanol | 22.5 | and slowly fed into the hot toluene oven 3 hours. After the monomer is added, the polymerization mixture was held at 110°–115° C. for 3 more hours, and the non-volatile was 76.9% indicating the polymerization is complete. The toluene is now vacuum stripped off. Towards the end of the vacuum stripping, vacuum was 25"of Hg and temperature was 133° C. After most of the toluene was stripped off, the hot resin was poured onto aluminum foil. The tack temperature of the resin was 180° F., ICI cone and plate viscosity was 18 poise and 200° C., 86 poise @175° C. and 485 poise @150° C. The acid number of the resin was 7.7 and the hydroxyl number of the resin was 86.3.

EXAMPLE 2B

Acrylic Polymer with OH# 129.5

This polymer was made similar to that of Example 2A, except the following monomer mixture was used:

| | Grams |
|---|---|
| 2-Hydroxyethyl methacrylate | 675 |
| Methyl methacrylate | 967.5 |
| Styrene | 202.5 |
| Ethyl acrylate | 405 |
| VAZO 64 | 45 |
| Mercapto ethanol | 22.5 |
| Methacrylic acid | 22.5 |

The tack temperature of the resin was 193° C., ICI cone and plate viscosity was 34 poise @200° C., 170 poise at 175° C. and off-scale at 150° C. The acid number of the resin was 7.1 and the hydroxyl number was 129.5.

EXAMPLE 2C

Acrylic Polymer with Butyl Acrylate

This polymer was also made similar to Ex. 2A, except the following monomer mixture was used:

| | Grams |
|---|---|
| 2-Hydroxyethyl methacrylate | 682 |
| Methyl methacrylate | 1068 |
| Styrene | 182 |
| Butyl acrylate | 296 |
| Methacrylic acid | 45 |
| VAZO 64 | 45 |
| Mercapto ethanol | 23 |

The tack temperature of the resin was 207° F. The ICI cone and plate viscosity was 32 poise at 200° C. 227 poise at 175° C., off scale at 150° C. The acid number of the resin is 13.9.

EXAMPLE 2D

Acrylic Polymer with Hydroxypropyl Methacrylate

This polymer was also made similar to Ex. 2A, except the following monomer mixture was used:

| | Grams |
|---|---|
| Hydroxypropyl methacrylate | 587 |
| Methyl methacrylate | 1140 |
| Butyl acrylate | 344 |
| Styrene | 253 |
| Methacrylic acid | 23 |
| Mercapto ethanol | 23 |
| VAZO 64 | 45 |

The tack temperature of the resin was 194.5° F., ICI cone and plate viscosity was 30 poise at 200° C., the acid number of resin was 7.1. From GPC analysis, the number average molecular weight is 4150, weight average molecular weight is 8650, and the polydispersity is 2.086.

EXAMPLE 2E

Hydroxyl Functional Acrylic Base Resin

Description: Glidden #10381-83

| | Wt. % | Constants | |
|---|---|---|---|
| Methyl methacrylate | 45–55 | Non-Volatile | 99.0% |
| Butyl acrylate | 12–16 | Acid Value | 6–8 |
| Styrene | 8–12 | Tack temperature | 190–195° F. |
| Hydroxy Propyl Methacrylate | 20–30 | Hydroxyl Value | 80–120 |

| -continued | | |
|---|---|---|
| | Wt. % | Constants |
| Methacrylic acid | 1–3 | |

EXAMPLE 3

Solid Cyclic Silicon Resin

Description: Dow Corning Z6018

| Composition | Wt. % | Constants | |
|---|---|---|---|
| Methyl Hydrogen Polysiloxane | 40–60 | Non-volatile content | 98% |
| Methyl Phenyl Polysiloxane | 40–60 | Softening Pt. | 60° C. |
| | | Hydroxyl Content | 6.4% |
| | | Hydroxyl Content | 6.4% |
| | | Acid Value | 37.8 |
| | | Melt Point | 85° C. |
| | | Specific Gravity | 1.23 |

EXAMPLE 4

Acrylic/Silicone Blend Formulations/Total Weight %

| | 4A SCX800B Std. Control | 4B Glidden 10381-83 Std. | 4C SCX800B 25% SI Blend | 4D SCX800B 50% SI Blend | 4E Glidden 50% SI Blend |
|---|---|---|---|---|---|
| Ex. 1-Johnson Wax SCX800B | 48–50 | — | 38–42 | 27–29 | — |
| Ex. 2-Glidden 10381-83 | — | 38–42 | — | — | 22–26 |
| Ex. 3-Dow Corning Z6018 | — | — | 11–15 | 27–29 | 22–26 |
| TiO₂ White Pigment Dupont R960 | 36–38 | 36–38 | 36–38 | 36–38 | 36–38 |
| Cargill P2400 Curing Agent* | 11–13 | 19–23 | 7–9 | 5–7 | 12–14 |
| Benzoin-Outgas Agent | .5–.7 | .5–.7 | .5–.7 | .5–.7 | .5–.7 |
| SBS Chemical Resiflow PL200 Flow Agent** | .3–.5 | .3–.5 | .3–.5 | .3–.5 | .3–.5 |

*Cargill P2400 Composition: E-caprolactam blocked copolymer of tremethanol propane and isophorone diisocyanate.
**Resiflow PL200 Composition: Copolymer of 2-hexyl, ethyl acrylate and butyl acrylate.

EXAMPLE 5

Powder Manufacturing Procedures

A. Weigh-up. All ingredients in Example 3 weighted to plus or minus 0.1 gram.

B. Premix Blending - Welex High Intensity Laboratory Mixer Model 20M; Mixing time 1 to 2 minutes at 1800 RPM.

C. Meltmix Extrusion - Buss Extruder/Kneader Model #PR-46

| Barrel Temp. | 110° C. | Feeder Setting | 6–8 |
|---|---|---|---|
| Screw Temp | 32° C. | Extruder Load | 4–5 Amps |
| Die Temp | 32° C. | Extruder Output | 30–40 Kg/Hr. |
| Screw Speed | 100 rpm | Post Die Processing | Chill Rolls |

D. Grinding. Micro Pulverizer Type CF; 0.1 Oval Screen 14,000 rpm; Liquid Nitrogen.

E. Sieving - Azo Rotary Sieve Cyclone Screener Model E240-B1;-140 Mesh Screen

EXAMPLE 6

The following is a summary of the current weatherometer and QUV accelerated exposure data of the powder coatings based on extruded blends of hydroxyl silicon resin (Dow Corning Z6018) and hydroxyl acrylic resin (Johnson SCX800A identified by monomer content). The acrylic resin alone in a standard powder coating formula served as a control.

| Exposure Test | WOM (ASTM G23) | | QUV (ASTM D4329) | |
|---|---|---|---|---|
| Pigmentation | White | Brown | White | Brown |
| Hours Exposed | 1500 | 1000 | 1500 | 600 |
| Gloss Retained | % 60° | % 60° | % 60° | % 60° |
| Example 4A-SCX800B/IPDI | 19 | 45 | 35 | 15 |
| Example 4B-Glidden 10381-83/IPDI | 36 | — | 41 | — |
| Example 4C-SCX800B/IPDI 25% Blend Dow Z6018 Silicone | 36 | 59 | 63 | 28 |
| Example 4D-SCX800B/IDPI 50% Blend Dow Z6018 Silicone | 76 | 72 | 84 | 83 |
| Example 4E-Glidden 10381-83/IPDI 50% Blend Dow Z6018 Silicone | 74 | 68 | 81 | 78 |

We claim:

1. A powder paint coating composition containing a thermosetting polymeric binder obtained by blending and extruding components comprising by weight:
50% to 75% of a low molecular weight hydroxyl functional acrylic copolymer having a Tg above about 40° C., the copolymer comprising copolymerized ethylenically unsaturated monomers between 50% and 73% acrylic monomer, between 7% and 30% hydroxyl functional monomer, with the balance being other ethylenically unsaturated monomer; and 25% to 50% of a solid cyclic silicone resin have a Tg above about 40° C., said silicone resin having at least two hydroxyl groups per silicone molecule and a number average molecular weight between about 600 and 8,000.

2. The powder paint composition in claim 1 where the solid cyclic silicone resin has the structural formula:

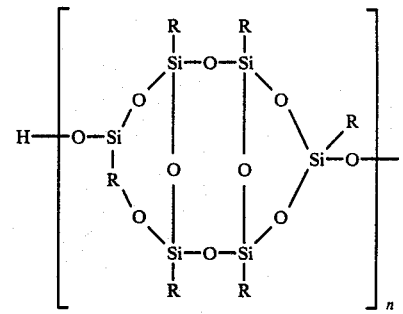

where R is independently selected from a lower alkyl group or a phenyl group, and n is between 1 and 12.

3. The powder paint in claim 2 where R is a methyl group or a ethyl group.

4. The powder paint in claim 2 where R is a methyl group.

5. The powder paint in claim 2 where R is an ethyl group.

6. The powder paint in claim 2 where R is a phenyl group.

* * * * *